(12) United States Patent
Kawazura et al.

(10) Patent No.: US 7,538,161 B2
(45) Date of Patent: May 26, 2009

(54) PRODUCTION AND BONDING METHOD OF ELASTOMER COMPOSITION

(75) Inventors: Tetsuji Kawazura, Hiratsuka (JP); Hajime Satoh, Hiratsuka (JP)

(73) Assignee: The Yokohama Rubber Co., Ltd., Tokyo (JP)

( * ) Notice: Subject to any disclaimer, the term of this patent is extended or adjusted under 35 U.S.C. 154(b) by 501 days.

(21) Appl. No.: 10/942,848

(22) Filed: Sep. 17, 2004

(65) Prior Publication Data

US 2005/0065289 A1    Mar. 24, 2005

(30) Foreign Application Priority Data

Sep. 22, 2003  (JP) ............................. 2003-329923
Nov. 19, 2003  (JP) ............................. 2003-389570
Mar. 4, 2004   (JP) ............................. 2004-061006

(51) Int. Cl.
*C08F 236/20* (2006.01)
*C08J 3/24* (2006.01)
*C08J 3/20* (2006.01)

(52) U.S. Cl. .................. 525/332.5; 525/331.9; 525/386
(58) Field of Classification Search .............. 525/331.9, 525/332.5, 386
See application file for complete search history.

(56) References Cited

U.S. PATENT DOCUMENTS 4,820,752 A * 4/1989 Berens et al. ................ 523/340

2006/0148985 A1 * 7/2006 Karthauser .................. 525/100

FOREIGN PATENT DOCUMENTS

| JP | 62-100535 | 5/1987 |
| JP | 08-169979 A1 | 7/1996 |
| JP | 11-348037 A1 | 12/1999 |
| JP | 2002256042 | 9/2002 |
| JP | 2003-292629 | 10/2003 |

OTHER PUBLICATIONS

Hawley's Condensed Chemical Dictionary, 13th edition, John Wiley & Sons, 1997, p. 507.*
O. Muth et al., "Polymer Modification by Supercritical Impregnation", The Journal of Supercritical Fluids, vol. 17, 2000, pp. 65-72, http://www.elsevier.com/locate/supflu.

* cited by examiner

*Primary Examiner*—Roberto Rábago
(74) *Attorney, Agent, or Firm*—Connolly Bove Lodge & Hutz LLP

(57) ABSTRACT

A method for producing an elastomer composition comprising allowing a cross-linked elastomer composition in the presence of (A) a fluid composed of a gaseous substance at an ordinary temperature and an ordinary pressure at a high pressure and (B) at least one component selected from a cross-linkable or polymerizable monomer, oligomer and polymer to thereby impregnate the component (B) into the cross-linked elastomer composition, then cross-linking or polymerizing the impregnated composition.

6 Claims, 3 Drawing Sheets

US 7,538,161 B2

PRODUCTION AND BONDING METHOD OF ELASTOMER COMPOSITION

TECHNICAL FIELD

The present invention relates to a method for producing and method for bonding an elastomer composition, more specifically, it relates to a method for producing and a method for bonding an elastomer composition having improved mechanical strength, etc. and new functions, etc. by impregnating, into a cross-linked elastomer composition, at least one component selected from another cross-linkable or polymerizable monomer, oligomer and polymer utilizing a high pressure fluid (e.g., supercritical carbon dioxide).

BACKGROUND ART

Various researches have been made to use substances such as carbon dioxide, water and propane in a supercritical state. Among these, U.S. Pat. No. 4,820,752 discloses, when blending additives into polymer materials such as rubbers or plastic materials to introduce additives to a polymer material, without using mechanical mixing means, by dissolving the additives in a compressed fluid of a substance normally (i.e., at an ordinary temperature and an ordinary pressure) in a gaseous state and bringing the fluid into contact with the polymer material. Further, JP-A-8-169979 discloses a method for treating and recycling vulcanized fluoro rubber waste by a mixture of a supercritical fluid and a strong alkali aqueous solution.

Further, JP-A-11-348037 discloses a method of modification by impregnating an antioxidant, antisticking agent, wax, etc. into a vulcanized rubber shaped article by supercritical state carbon dioxide in which these are dissolved. However, none of these documents discloses the concept of newly introducing a cross-linkable or polymerizable monomer, oligomer, or polymer into a cross-linked elastomer composition, followed by polymerizing or cross-linking to thereafter form the formation of a new polymer network in an existing polymer network.

Further, *Journal of Supercritical Fluids* 17 (2000) 65-72 describes modification of a polymer by supercritical impregnation, but there is not deemed to be any description in this publication regarding modification of a cross-linked polymer.

DISCLOSURE OF INVENTION

An object of the present invention is to impregnate a cross-linkable or polymerizable substance into a cross-linked elastomer composition by placing the elastomer composition in the copresence of a fluid composed of a gaseous substance at an ordinary temperature and an ordinary pressure held at a high pressure and a cross-linkable or polymerizable substance (i.e., at least one substance selected from monomers, oligomers and polymers) and then causing cross-linking or polymerization to improve the strength of the elastomer composition and impart other new functions.

Another object of the present invention is to bond cross-linked rubbers or a cross-linked rubber and another or other different rubbers by impregnation of said cross-linked elastomer with a cross-linkable or polymerizable monomer, followed by heat treatment.

In accordance with the present invention, there is provided a method for producing an elastomer composition comprising allowing a cross-linked elastomer composition to be copresent with (A) a fluid composed of a gaseous substance at an ordinary temperature and an ordinary pressure held at a high pressure and (B) at least one component selected from the group consisting of cross-linkable or polymerizable monomers, oligomers and polymers to thereby impregnate said component (B) into the cross-linked elastomer composition, then cross-linking or polymerizing the impregnated composition.

In accordance with the present invention, there is provided a method for producing an elastomer composition comprising allowing (A) a cross-linked elastomer composition including metal atoms reactable with carboxyl groups in the copresence of a fluid comprised of a gaseous substance at an ordinary temperature and an ordinary pressure held at a high pressure and (B) a cross-linkable or polymerizable monomer having carboxyl groups to thereby impregnate said monomer, followed by polymerizing the impregnated monomer.

In accordance with the present invention, there is provided a method for bonding a cross-linked elastomer composition comprising allowing the cross-linked elastomer composition to be copresent with (A) a fluid composed of a gaseous substance at an ordinary temperature and an ordinary pressure held at a high pressure, (B') a cross-linkable or polymerizable monomer and (C) a polymerization initiator to thereby impregnate the components (B') and (C) into the elastomer composition, then heat treating that impregnated elastomer composition in the state brought in contact with the same or another impregnated or non-impregnated elastomer composition.

In accordance with the present invention, by placing a cross-linked elastomer composition in the copresence of (B) at least one substance selected from a cross-linkable or polymerizable monomer, oligomer and polymer (hereinafter sometimes referred to as the component (B)) in (A) a fluid (hereinafter sometimes referred to as the component (A)) of a "gaseous substance at ordinary temperature and a ordinary pressure" (e.g., $CO_2$) held at a high pressure under predetermined conditions (temperature, pressure, time, etc.), it is possible to impregnate that monomer, oligomer, and/or polymer into the cross-linked elastomer, and by later cross-linking or polymerization, it is possible to produce a new polymer network in the cross-linked rubber and possible to improve the strength of the elastomer composition and impart new functions thereto.

In accordance with the present invention, further, by placing the cross-linked elastomer composition in the copresence of a cross-linkable or polymerizable monomer (B') and polymerization initiator (C) in said component (A) held at a high pressure under predetermined conditions, it is possible to impregnate the cross-linked elastomer composition with said components (B') and (C). By bonding and heat treating that cross-linked elastomer composition with an impregnated or nonimpregnated elastomer composition of the same type or different type, it is possible to effectively bond the two.

BRIEF DESCRIPTION OF THE DRAWINGS

The present invention will now be explained with reference to the drawings wherein.

BEST MODE FOR CARRYING OUT THE INVENTION

As the polymer forming the cross-linked elastomer composition used in the method of production of an elastomer composition according to the present invention, it is possible to use a cross-linkable polymer having a glass transition temperature Tg of not more than a room temperature (25° C.) and exhibiting entropy elasticity. That is, the rubber ingredient blended into said elastomer composition may be made a cross-linkable rubber generally used for tires and other rubber in the past. Specifically, diene-based rubbers such as various types of natural rubbers (NR), various types of polyisoprene rubbers (IR), various types of styrene-butadiene copolymer rubbers (SBR), various types of polybutadiene rubbers (BR), various types of styrene-isoprene-butadiene copolymer rubbers (SIBR), various types of acrylonitrile-butadiene copolymer rubbers (NBR), various types of ethylene-propylenediene terpolymer rubbers (EPDM), various types of chloroprene rubbers (CR), various types of butyl rubbers (IIR) may be exemplified. These may be used alone or in any mixture thereof. As the rubber ingredients capable of blending into the rubber composition according to the present invention, further, isobutylene p-methylstyrene copolymer rubber and its bromide, ethylene propylene rubber (EPM), fluororubber (FKM), chlorosulfonated polyethylene rubber (CSM), chlorinated polyethylene (CM), acryl rubber (ACM), epichlorohydrin rubber (ECO, CO), urethane rubber, silicone rubber, etc. may be mentioned. These may be used alone or in any mixture thereof or as blends with said diene-based rubbers.

As the cross-linked elastomer composition including metal atoms (for example, Zn, Na, Li, Mg) capable of reacting with carboxyl groups used in the second aspect of the present invention, it is possible to use those similar to those explained above. When introducing metal atoms in the elastomer composition into said elastomer composition, it is sufficient to mix oxides, hydroxides, carbonates, acetates, etc. of the metal in the elastomer composition before cross-linking by a method known in the past. Further, as the organic metal complex dissolved in the substance (A), it is also possible to dissolve it in the substance (A) and impregnate it in the same way as introduction of said monomer. The amount of the metal atoms blended into the elastomer composition is preferably 5 mol % to 100 mol % with respect to the carboxyl groups of the monomer having carboxyl groups introduced into the cross-linked elastomer composition, but there is no particular problem even if used in the excess amount.

Figure 3:
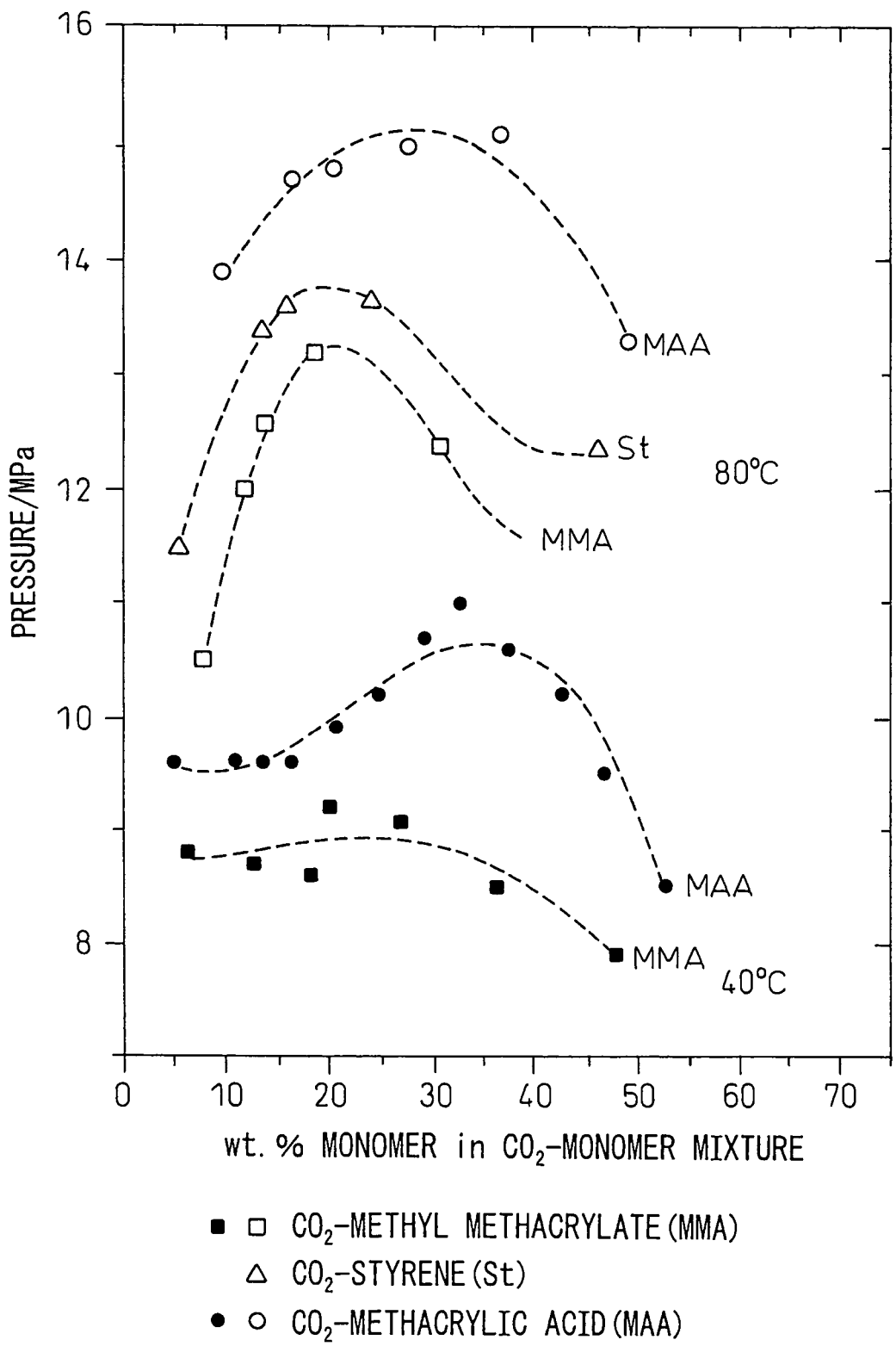
FIG. 3 shows a typical phase diagram for $CO_2$ and several monomers, i.e., methyl methacrylate (MMA), styrene (St) and methacrylic acid (MAA), shown as FIG. 1 on page 68 of Journal of Supercritical Fluids 17 (2000)

In the present invention, the cross-linked elastomer composition can be brought into contact with an ingredient (B) composed of at least one substance selected from the group consisting of cross-linkable or polymerizable monomers, oligomers and polymers in a fluid composed of the gaseous substance (A) at an ordinary temperature and an ordinary pressure, for example, carbon dioxide ($CO_2$), ethane ($C_2H_6$), propane ($C_3H_8$), ammonia ($NH_3$), dinitrogen oxide ($N_2O$), etc. held at a high pressure so as to impregnate these into the rubber ingredient. The "high pressure" used herein means that the pressure range of the gaseous substance (A) used in the present invention is defined as a pressure range in which the ingredient (B) is soluble in the substance (A) and the pressure range is described in a phase diagram for the selected (A) and (B). The typical phase diagram for $CO_2$ and several monomers, i.e., methacrylic acid, methyl methacrylate and styrene, are, for example, given in the literature (O. Muth, Th. Hirth, H. Vogel, *Journal of Supercritical Fluid*, 17, 65-72 (2000)) and the diagram is cited herein as FIG. 3. By suitable post treatment (e.g., heating, wet curing, etc.), a new network can be formed by the monomer, oligomer, polymer, etc., impregnated into the elastomer composition after cross-linking, the mechanical strength etc. can be increased, and other functions (for example, solvent resistance) can be imparted.

In general, when cross-linking rubber or another elastomer composition, there are limits to the usable cross-linking system due to the polymer in the composition. For example, with rubber, a combination of sulfur and a vulcanization accelerator or an organic peroxide etc. is used. It was impossible in many cases to blend in a monomer, polymer or oligomer by another cross-linking mechanism to form an independent network. This is because, with mixing of cross-linking systems, the two cross-linking systems interfere with each other. However, as in the present invention, by cross-linking the elastomer composition in advance, then impregnating a monomer, oligomer or polymer having a separate cross-linking mechanism, a novel elastomer composition is created. It is possible to inject the monomer, oligomer or polymer into the elastomer using an organic solvent etc. capable of dissolving the monomer, polymer or oligomer and cause the cross-linked elastomer composition to swell, but when removing the organic solvent in this case, there were the problems that the injected substance ended up agglomerating and insufficiently dispersing or being extracted together. Further, using a large amount of an organic solvent posed problems in terms of the environment. However, if using carbon dioxide or another fluid gaseous at an ordinary temperature and an ordinary pressure, the solubility of the injected substance can be controlled by controlling the temperature and pressure, so by controlling the pressure etc. after impregnating the injected substance etc. so as to immediately lower the solubility of the injected substance, it becomes possible to leave the injected substance in the cross-linked elastomer. Further, by lowering the pressure of the fluid to make it a gas, removal of the fluid becomes extremely easy. Further, when using carbon dioxide, no serious problems arise in terms of safety or the work environment etc.

The component (A) of the present invention, that is, the "fluid composed of a gaseous substance at an ordinary temperature and an ordinary pressure held at a high pressure", is a substance with a boiling point below ordinary temperature (e.g., 23° C.) at an ordinary pressure (i.e., 1 atmosphere) obtained by raising the temperature and raising the pressure or lowering the temperature and raising the pressure. This fluid may be in any of the liquid state, mixed gas-liquid state or supercritical state, but near the critical point or in the supercritical state is preferred. Specifically, this is held at conditions of a pressure of 3 to 30 MPa at a temperature of 0 to 200° C. If the pressure for holding the fluid component (A) gaseous at an ordinary temperature and an ordinary pressure used in the present invention is less than 3 MPa, the solubility of the polymerizable substance will become insufficient, while if more than 30 MPa, the energy for creating the high pressure state will become higher, and therefore this is not preferred. If the temperature is less than 0° C., the heat motion of the segments forming the molecules of the polymer serving as the ingredient of the cross-linked elastomer composition will be diminished and the impregnation efficiency of the polymerizable substance will be decreased, while if more than 200° C., the thermal degradation of the cross-linked elastomer will become remarkable, and, therefore, this is not preferred.

The method for impregnating the cross-linked elastomer composition with the cross-linkable or polymerizable component (B) by the fluid is not particularly limited, but the method of placing the component (B) in the copresence in an autoclave filled with the fluid, the method of dissolving the component (B) in the fluid component (A) in advance, then bringing it into contact with the cross-linked elastomer, etc. may be suitably used. To ensure that the component (B) be efficiently dissolved in the fluid component (A), the contact area between the component (B) and the fluid component (A) is preferably made as large as possible. Note that the fluid component (A) may include other components usually called "entrainers". Entrainers usually are added to adjust the solubility parameter of the fluid component (A). It is possible to select any of one or more of organic solvents or organic compounds (e.g., gases, liquids, and solids) dissolving in the fluid component (A). For example, as entrainers used for carbon dioxide, methanol, ethanol, octane, various types of fatty acids, etc. may be mentioned, but, of course, the invention is not limited to these.

The amount of the cross-linkable or polymerizable substance (B) (i.e., at least one type of monomer, oligomer and polymer) made copresent with the cross-linked elastomer and the fluid composed of the substance (A) gaseous at an ordinary temperature and an ordinary pressure held at a high pressure is preferably made 1 to 1000 parts by weight based upon 100 parts by weight of the polymer component in the cross-linked elastomer. This amount is defined as the amount of the polymerizable substance which must be present in the system used for actual treatment over the actual treatment time by the fluid (A). For example, it is necessary to charge 1 to 1000 parts by weight of the polymerizable substance based upon 100 parts by weight of the polymer component in the cross-linked elastomer in treatment by a batch method. Further, when dissolving the polymerizable substance in the fluid component (A) in advance and then performing treatment while supplying this fluid into the treatment system, it is necessary to adjust the concentration so that the polymerizable substance is constantly present in this range of amount in the system actually used for the treatment. If the amount of the polymerizable substance is less than 1 part by weight, the time until a sufficient impregnated amount is actually obtained becomes long, and therefore, this is not preferred. Conversely, if more than 1000 parts by weight, the substance will not dissolve in the fluid component (A) or the not impregnated part will increase, and therefore, this is not preferable from the viewpoints of maintenance of the treatment apparatus and effective utilization of resources.

As the monomer capable of using in the method of production of an elastomer composition according to the present invention, those which self polymerize by heat etc., those which self cross-link by humidity etc., and those which polymerize by addition of various types of polymerization initiators may be used. As the specific examples various vinyl monomers such as vinyl acetate, styrene and styrene derivatives, vinyl pyridine and its derivatives, various types of vinyl ethers, isoprene, acrylonitrile, various types of acrylamides, various types of acrylic acids, various types of acrylic acid esters, vinyl carbazole, maleic anhydride, various types of vinyl isocyanates may be used. These monomers may be used alone or together with other monomers. However, maleic anhydride must be used with care that it not polymerize alone. In addition to the examples above, it is also possible to use monomers having an e-values (indicator of monomer polarity: see T. Alfrey, Jr., J. J. Bohrer, H. Mark, *Copolymerization*, p. 64 (1952), Interscience) in the range of −1.0 to 1.7, that is, monomers having e-values in this range described in *Polymer Handbook Fourth Edition*, p. II-310 (1999), John Wiley & Sons Inc., Table 1.

As the cross-linkable or polymerizable monomer containing carboxyl groups used in the second aspect of the present invention, for example, among the above, various types of acrylic acids, maleic anhydride, various types of styrene derivatives having carboxyl groups, etc. may be mentioned. Further, if necessary, among the above cross-linkable or polymerizable monomers, those not having carboxyl groups may also be jointly used.

The monomer may be polymerized by heat etc., but preferably a polymerization initiator is used. The polymerization initiator may be impregnated into said cross-linked elastomer by a method similar to the method of impregnation of said monomer. Note that this procedure may be performed at the same time as or before or after the procedure for impregnating said monomer in the elastomer composition processed by said fluid. As such a polymerization initiator, various types of organic peroxides and various types of azo-based initiators, tetramethylthiuram disulfide and other disulfide compounds, etc. may be suitably used. As specific examples of organic peroxides, diisobutyl peroxide, cumyl peroxyneodecanoate, di-n-propyl peroxydicarbonate, diisopropyl peroxydicarbonate, di-sec-butyl peroxydicarbonate, 1,1,3,3-tetramethylbutyl peroxyneodecanoate, di(4-t-butylcyclohexyl) peroxydicarbonate, 1-cyclohexyl-1-methylethyl peroxyneodecanoate, di(2-ethoxyethyl) peroxydicarbonate, di(2-ethylhexyl) peroxydicarbonate, t-hexyl peroxyneodecanoate, dimethoxybutyl peroxydicarbonate, t-butyl peroxyneodecanoate, t-hexyl peroxypivalate, t-butyl peroxypivalate, di(3,3,5-trimethylhexanoyl)peroxide, di-n-octanoyl peroxide, dilauroyl peroxide, stearyol peroxide, 1,1,3,3-tetramethylbutyl peroxy-2-ethyl hexanoate, disuccinate peroxide, 2,5-dimethyl-2,5-di (2-ethylhexanoylperoxy)hexane, t-hexylperoxy-2-ethylhexanoate, di(4-methylbenzoyl)peroxide, t-butylperoxy-2-ethylhexanoate, di(3-methylbenzoyl)peroxide, benzoyl(3-methylbenzoyl)peroxide, dibenzoyl peroxide, t-butyl peroxyisobutyrate, 1,1,1-di(t-butylperoxy)2-methyl-cyclohexane, 1,1-di(t-hexylperoxy)-3,3,5-trimethylcyclohexane, 1,1-di(t-hexyperoxy)cyclohexane, 1,1-di(t-hexylperoxy)-3,3,5-trimethylcyclohexane, 1,1-di(t-butylperoxy) cyclohexane, 2,2-di(4,4-di-(t-butylperoxy)cyclohexyl) propane, t-hexylperoxyisopropyl monocarbonate, t-butylperoxy maleate, t-butylperoxy-3,3,5-trimethylhexanoate, t-butylperoxylaurate, 2,5-dimethyl-2,5-di-(3-methylbenzoylperoxy)hexane, t-butylperoxyisopropyl monocarbonate, t-butylperoxy2-ethylhexyl monocarbonate, t-hexylperoxybenzoate, 2,5-dimethyl-2,5-di-(benzoylperoxy)hexane, t-butylperoxy acetate, 2,2-di-(t-butylperoxy)butane, t-butylperoxy benzoate, n-butyl4,4-di-(t-butylperoxy) valerate, di(2-t-butylperoxyisopropyl)benzene, dicumyl peroxide, di-t-hexylperoxide, 2,5-dimethyl-2,5-di(t-butylperoxy)hexane, t-butylcumyl peroxide, di-t-butyl peroxide, p-methane hydroperoxide, 2,5-dimethyl-2,5-di-(t-butylperoxy)hexine-3, diisopropylbenzene hydroperoxide, 1,1,3,3-tetramethylbutyl hydroperoxide, cumen hydroperoxide, t-butyl hydroperoxide, t-butyl trimethylsilyl peroxide, 2,3-dimethyl-2,3-diphenylbutane, etc. may be mentioned.

As specific examples of the azo-based initiator, 2,2'-azobis (4-methoxy-2,4-dimethylvaleronitrile), 2-2'-azobis(2,4-dimethylvaleronitrile), 2-2'-azobisisobutyronitrile, 2-2'-azobis (2-methylbutyronitrile), 1,1'-azobis(cyclohexane-1-carbonitrile), 1-[(1-cyano-1-methylethyl)azo]formamide, 2-2'-azobis{2-methyl-N-[1,1-bis(hydroxymethyl)-2-hydroxyethyl]propionamide}, 2-2'-azobis{2-methyl-N-[2-(1-hydroxybutyl)]-propionamide}, 2-2'-azobis[2-methyl-N-(2- hydroxyethyl)-propionamide], 2-2'-azobis(N-butyl-2-methylpropionamide), 2-2'-azobis(N-cyclohexyl-2-methylpropionamide), 2-2'-azobis[2-(5-methyl-2-imidazolin-2-yl)propane]dihydrochloride, 2-2'-azobis[2-(2-imidazolin-2-yl)propane]dihydrochloride, 2-2'-azobis[2-(2-imidazolin-2-yl)propane]disulfatedihydrate, 2-2'-azobis[2-(3,4,5,6-tetrahydropyrimidin-2-yl)propane]dihydrochloride, 2-2'-azobis{2-[1-(2-hydroxyethyl)-2-imidazolin-2-yl]propane}dihydrochloride, 2-2'-azobis[2-(2-imidazoylin-2-yl)propane], 2-2'-azobis(2-methylpropionamidine)dihydrochloride, 2-2'-azobis[N-(2-carboxyethyl)-2-methylpropionamidine], 2,2-azobis(2-methylpropionamideoxime),dimethyl2-2'-azobis(2-methylpropionate), 4,4'-azobis(4-cyanovaleric acid), 2-2'-azobis(2,2,4-trimethylpentane), etc. may be mentioned.

As the oligomer and polymer capable of using in the method of production of an elastomer composition according to the present invention, one which self cross-links by heat, humidity, etc. or one which cross-links by addition of various types of cross-linking agents may be mentioned. As specific examples of ones which self cross-link, a urethane oligomer, urethane prepolymer or other substance having two or more isocyanate groups in the molecule, a silicone polymer or other substance having two or more alkoxysilyl groups in the molecule, etc. may be mentioned. As those which cross-link by addition of a cross-linking agent, a polymer having a plurality of unsaturated bonds or various functional groups capable of reacting with conventionally known cross-linking agents in the molecule may be suitably utilized.

As explained above, the elastomer composition according to the present invention may include a cross-linking agent, if necessary. As the method of impregnating the cross-linking agent, the method is adopted of dissolving it in a fluid composed of a gaseous substance at an ordinary temperature and an ordinary pressure held at a high pressure to impregnate it into the cross-linked elastomer composition. Note that this procedure may be performed simultaneously with or before or after the procedure for impregnating the elastomer composition processed by said fluid with a cross-linkable or polymerizable oligomer or polymer. As the cross-linking agent which can be used, various types of sulfur donors, various types of thiuram-based vulcanization accelerators, various types of organic peroxides, xenon dioxime, organic polyhydric amines, alkyl phenols having methylol groups, and other agents known in the past may be used.

As explained above, the cross-linked elastomer composition impregnated with the cross-linkable or polymerizable substance (i.e., at least one type of substance selected from monomers, oligomers and polymers) can be post treated by various methods so that the impregnated cross-linkable or polymerizable substance is polymerized or cross-linked. For example, the method of setting the conditions for cross-linking or polymerization (e.g., the temperature, moisture addition, etc.) after or while impregnating the cross-linkable or polymerizable substance and the method of setting the conditions for cross-linking or polymerization (e.g., temperature, humidity, etc.) after removing the composition from the fluid treatment atmosphere may be adopted. By the impregnated cross-linkable or polymerizable substance being at least partially cross-linked or polymerized by such a procedure, the strength of the cross-linked elastomer composition can be improved and new functions imparted. At this time, the polymerizable substance is sometimes grafted to the molecular chain of the cross-linked elastomer composition. Further, when using an organic peroxide as the polymerization initiator, this sometimes acts as a cross-linking agent and cross-links the cross-linked elastomer composition. When using a monomer having carboxy groups as the polymerizable monomer and the elastomer composition includes metal atoms reactive with the carboxyl groups, at least part of the carboxyl groups and metal atoms (positive ions) form ion bonds.

According to the present invention, further, the cross-linked elastomer composition is placed in the copresence of the component (A), said cross-linkable or polymerizable monomer (hereinafter referred to as the "ingredient (B')), and radical initiator (C) so as to impregnate (or include) the ingredient (B') and (C) in the cross-linked elastomer composition. The cross-linked elastomer composition impregnated with or including the cross-linkable or polymerizable monomer (B') and radical initiator (C) thus obtained is brought into contact with another cross-linked or noncross-linked elastomer composition impregnated or not impregnated with the ingredients (B') and (C) of the same type or other type and heat treated in that state (e.g., 120 to 200° C. for 5 to 60 minutes) to cause polymerization at the contact faces of the two and firmly bond the two. The cross-linkable or polymerizable monomer (B') used here may be a monomer used in the method of production of an elastomer composition according to the present invention explained above. It is possible to use those which self polymerize by heat etc., those which self cross-link by humidity etc. or those with polymerize by the addition of various types of polymerization initiators. Further, the polymerization initiator used may be one of the above-mentioned various types of organic peroxides and various types of azo-based initiators, disulfide compounds such as tetramethylthiuram disulfide etc.

The amounts of the cross-linkable or polymerizable monomer (B') and polymerization initiator (C) blended are not particularly limited, but preferably are 0.3 to 5 parts by weight based upon the amount of the cross-linked elastomer.

The elastomer composition according to the present invention may contain therein, in addition to the above essential components, fillers such as carbon black, silica, a vulcanization or cross-linking accelerator, various types of oil, an antioxidant, a plasticizer, or other various additives generally blended into general rubber at the time before the cross-linked elastomer (elastomer before treatment by fluid) is cross-linked. These additives may be mixed and vulcanized to obtain the composition by a general method. The amounts of these additives blended may be made the conventional general amounts blended in so far as the object of the present invention is not contravened.

EXAMPLES

Examples will now be used to further explain the present invention, but, of course, the scope of the present invention is not limited to these Examples.

Example 1 and Comparative Example 1

Preparation of Samples (Same for Example 1 and Comparative Example 1)

The ingredients other than the vulcanization accelerator and sulfur in the formulation (parts by weight) shown in Table I were mixed in a 1.5 liter internal mixer for 4 minutes and discharged to obtain a master batch. The vulcanization accelerator and sulfur were mixed into the master batch by an open roll to obtain a rubber composition. The composition was vulcanized in a 6-inch×6-inch×1 mm mold at 160° C. for 20 minutes to obtain a vulcanized rubber sheet.

TABLE I

| Ingredient | Parts by weight |
|---|---|
| Synthetic isoprene rubber[*1] | 100.0 |
| Zinc oxide | 3.0 |
| Stearic acid | 2.0 |
| Sulfur | 1.5 |
| Vulcanization accelerator (BBS)[*2] | 1.0 |

[*1]Polyisoprene (Nipol IR2200, made by Japan Zeon)
[*2]N-tert-butyl-2-benzothiazolylsulfenamide (Sanceler NS-F made by Sanshin Chemical Industry)

Treatment by Fluid (Only for Example 1)

The rubber sheet obtained above was placed in a 0.5 liter autoclave set in a thermostat together with filter paper absorbing a urethane prepolymer. Liquefied carbon dioxide was added thereto to raise it to a predetermined temperature and pressure. At that time, the pressure was adjusted by supplying carbon dioxide by a pressurizing pump. After reaching the predetermined temperature and pressure (i.e., 33° C. and 12 MPa), the autoclave was maintained in that state for the predetermined time (i.e., 180 minutes). Next, a leak valve was opened and the autoclave was returned to an ordinary pressure over about 2 minutes. The urethane prepolymer was obtained by a reaction of the formulation shown in Table II at 80° C. over 24 hours. The NCO content of the urethane prepolymer was 1.06% by weight.

TABLE II

| Ingredient | Parts by weight |
|---|---|
| Polyol[*1] | 30 |
| Polyol[*2] | 70 |
| Plasticizer (DINA)[*3] | 22 |
| MDI[*4] | [*5] |

[*1]Excenol 2020, number average molecular weight 2000, bifunctional: made by Asahi Glass
[*2]Excenol 5030, number average molecular weight 5000, trifunctional: made by Asahi Glass
[*3]Diisononyl adipate: made by Shin Nihon Rica K.K.
[*4]Diphenyl methane diisocyanate and its oligomer: Cosmonate MDI made by Mitsui Chemicals
[*5]Charged to give molar ratio of isocyanate groups/hydroxy groups of 1.7

Post Treatment Procedure (Only for Example 1)

To cause cross-linking of the isocyanate groups bonded at the ends of molecules of the urethane prepolymer, a wet heat oven held at 40° C. and a humidity of 98% was used for treatment over about 15 hours to obtain the desired rubber composition.

Measurement Methods

1. Qualitative Analysis of Composition

Figure 1:
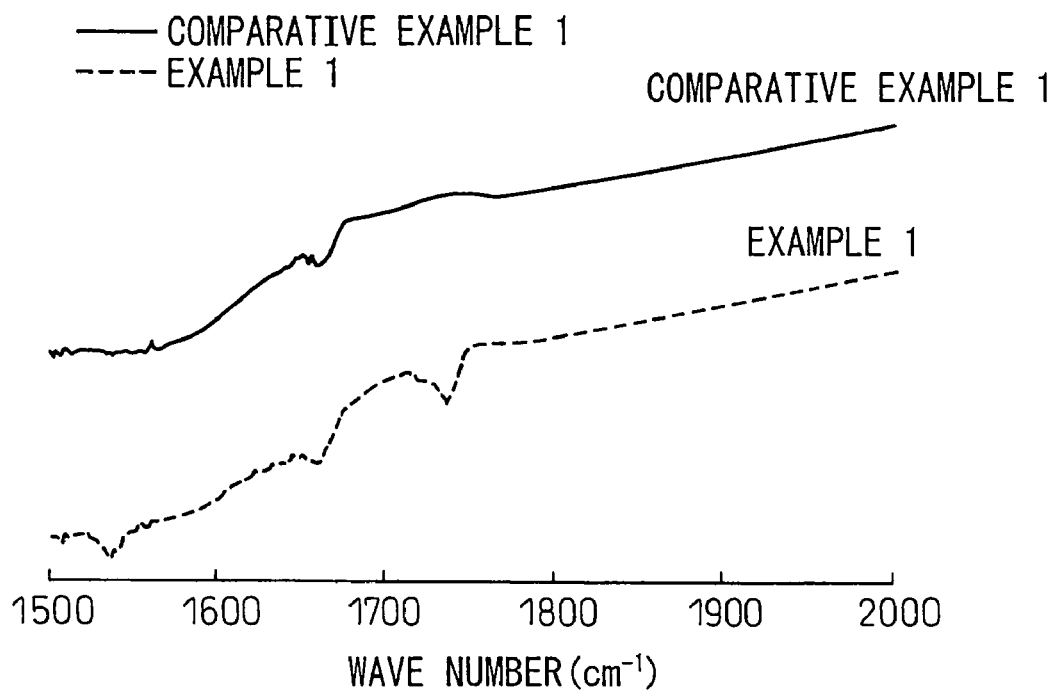
FIG. 1 shows IR measurement chart of cross-section of sheets of rubber composition treated by Example 1 and untreated rubber composition of Comparative Example 1.

To confirm the impregnation of the rubber sheet with the urethane prepolymer, the cross-section of the sheet of the rubber composition obtained was measured for IR (infrared absorption). The results are shown in FIG. 1. In Example 1, absorption was observed near 1530 cm$^{-1}$ attributable to the C=O bonds of urethane and, simultaneously, absorption of the plasticizer (DINA) was observed near 1740 cm$^{-1}$. From this, it will be understood that the cross-linked rubber sheet of this Example was impregnated with a urethane prepolymer.

2. Measurement of Stress-Strain Curve

Figure 2:
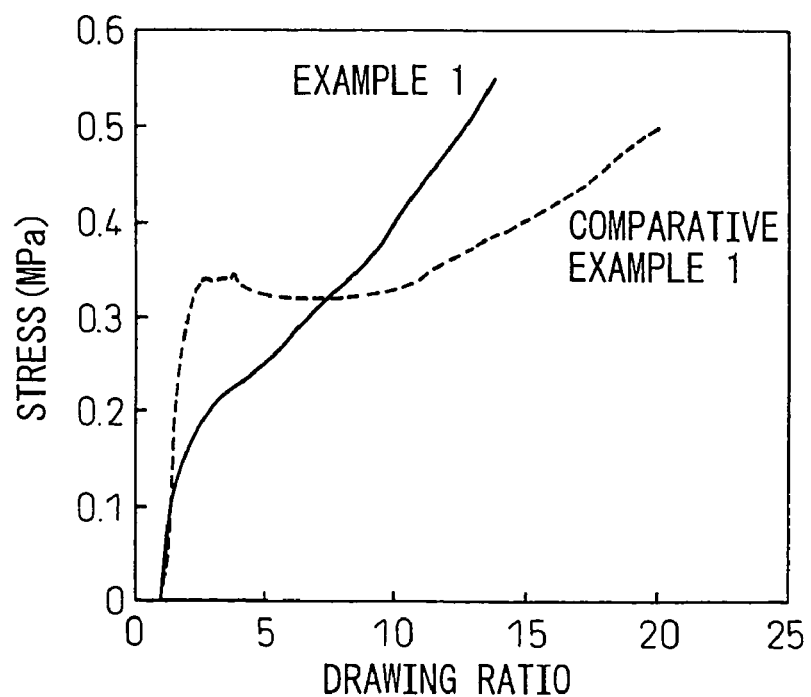
FIG. 2 is a chart of tensile test results of treated rubber composition obtained in Example 1 and untreated rubber composition of Comparative Example 1.

The stress-strain curve of the rubber sheet thus obtained is shown in FIG. 2. The measurement was conducted based on JIS (i.e., Japanese Industrial Standards) K6251 at a speed of 500 mm/min at 25° C. Example 1 exhibited a high stress at the high drawing region and also a high stress at the time of break.

It is learned that the impregnated cross-linked urethane prepolymer reinforces the original vulcanized rubber.

Examples 2 and 3 and Comparative Example 2

Preparation of Samples (Same for Examples 2 and 3 and Comparative Example 2)

The ingredients other than the vulcanization accelerator and sulfur in the formulation (parts by weight) shown in Table III were mixed in a 1.5 liter internal mixer for 4 minutes and discharged to obtain a master batch. The vulcanization accelerator and sulfur were mixed into each master batch with an open roll to obtain a rubber composition. The composition was vulcanized in a 6-inch×6-inch×1 mm mold at 160° C. for 20 minutes to obtain a vulcanized rubber sheet.

Treatment by Fluid (Only for Examples 2 and 3)

Example 2

The rubber sheet obtained above was placed in a 0.5 liter autoclave set in a thermostat together with filter paper impregnated with methacrylic acid (monomer). Liquefied carbon dioxide was added thereto to raise to 32° C. and 11.8 MPa. At that time, the pressure was adjusted by supplying carbon dioxide by a pressurizing pump. The autoclave was maintained in that state for the predetermined time (i.e., 60 minutes). Next, a leak valve was opened and the autoclave was returned to an ordinary pressure over about 2 minutes. The weight of the rubber sheet before and after treatment was measured. As a result, an increase in weight of 15.8% by weight was observed.

Example 3

The same procedure as in Example 2 was followed except for placing and treating the rubber sheet in the autoclave together with filter paper absorbing methacrylic acid (monomer) and dicumyl peroxide (DCP). The weight of the rubber sheet increased by 13.1% by weight before and after treatment.

Post Treatment Procedure

To cause a polymerization and/or graft reaction of the methacrylic acid impregnated in the rubber sheet, each sheet was heat treated at 160° C. for 30 minutes in a mold. The stress-strain characteristic of each rubber sheet obtained is shown in Table III. The measurement was conducted according to JIS K6251 at a speed of 500 mm/min at 25° C. Example 2 and Example 3 showed the improvements in the modulus and breakage strength. In particular, Example 3 with the combined use of a polymerization initiator exhibited a striking improvement in strength. It is learned that the impregnated and polymerized (part grafted with IR) monomer reinforces the vulcanized rubber.

TABLE III

|  | Comp. Ex. 2 | Ex. 2 | Ex. 3 |
|---|---|---|---|
| Formulation (parts by weight) | | | |
| IR[*1] | 100 | 100 | 100 |
| Zinc oxide[*2] | 10 | 10 | 10 |
| Stearic acid | 2.0 | 2.0 | 2.0 |
| Antioxidant 6PPD[*3] | 1.0 | 1.0 | 1.0 |
| Sulfur | 1.5 | 1.5 | 1.5 |
| Vulcanization accelerator BBS[*4] | 1.0 | 1.0 | 1.0 |
| Cross-linking condition: temperature (° C.)/time (min) | 160/20 | 160/20 | 160/20 |

TABLE III-continued

|  | Comp. Ex. 2 | Ex. 2 | Ex. 3 |
|---|---|---|---|
| Treatment conditions |  |  |  |
| Treatment by fluid | None | Yes | Yes |
| Fluid used | — | $CO_2$ | $CO_2$ |
| Monomer used | — | MAA*5 | MAA*5 |
| Polymerization initiator used | — | None | DCP*6 |
| Temperature (° C.) | — | 32 | 32 |
| Pressure (MPa) | — | 11.8 | 11.8 |
| Time (min) | — | 60 | 60 |
| Change in weight after treatment (wt %) |  | 15.8 | 13.1 |
| Heat treatment conditions: temperature (° C.)/time (min) | 160/30 | 160/30 | 160/30 |
| Tensile test results |  |  |  |
| $M_{100}$ (MPa) | 0.8 | 0.8 | 1.2 |
| $M_{200}$ (MPa) | 1.0 | 1.2 | 2.0 |
| $M_{300}$ (MPa) | 1.3 | 1.4 | 3.2 |
| $M_{400}$ (MPa) | 1.7 | 2.1 | 7.8 |
| $T_B$ (MPa) | 5.7 | 8.9 | 21.9 |
| $E_B$ (%) | 687 | 652 | 501 |
| Solvent resistance test |  |  |  |
| $t_{0.5}$ (index)*7 | 100 | 130 | 130 |

*1Synthetic isoprene rubber (Nipol IR2200, made by Nippon Zeon)
*2Zinc oxide (AZO, made by Seido Chemical Industry)
*3N-(1,3-dimethylbutyl)-N'-phenyl-p-phenylene diamine (Antigene 6C, made by Sumitomo Chemical)
*4N-tert-butyl-2-benzothiazolyl sulfenamide (Sanceler-NS-F, made by Sanshin Chemical Industry)
*5Methacrylic acid (made by Kanto Chemical)
*6Dicumyl peroxide (made by Aldrich Chemical)
*7Time required until change in weight saturates when immersing sample in toluene

Examples 4 and 5 and Comparative Examples 3 and 4

Preparation of Samples

The ingredients other than the vulcanization accelerator and sulfur in each of the formulations (parts by weight) shown in Table IV were mixed in a 1.5 liter internal mixer for 4 minutes and discharged to obtain a master batch. The vulcanization accelerator and sulfur were mixed into each master batch with an open roll to obtain a rubber composition. Each composition was vulcanized in a 6-inch×6-inch×1 mm mold at 160° C. for 20 minutes to obtain a cross-linked rubber sheet.

Treatment by Fluid (Only for Examples 4 and 5)

Treatment Conditions

Each of the cross-linked rubber sheets obtained above, a methacrylic acid monomer (MMA) and a polymerization initiator (organic peroxide, DCP) were placed in an autoclave, then carbon dioxide was filled and the treatment was performed at a predetermined temperature and pressure for a predetermined time as shown in Table IV. After the treatment, the chamber was reduced in pressure to 6 MPa at 25° C. and held there for 30 minutes, then returned to ordinary pressure over about 2 minutes.

Curing Reaction

Each of the rubber sheets obtained was heat treated by a hot plate press at 160° C. for 20 minutes. The stress-strain characteristics of the pressed heat-treated rubber sheets obtained are shown in Table IV. The measurement was conducted according to JIS K6251 at a speed of 500 mm/min. The results are shown in Table IV.

TABLE IV

|  | Comp. Ex. 3 | Comp. Ex. 4 | Ex. 4 | Ex. 5 |
|---|---|---|---|---|
| Formulation (parts by weight) |  |  |  |  |
| IR*1 | 100 | 100 | 100 | 100 |
| Zinc oxide*2 | 10 | — | 10 | — |
| Zinc oxide*3 | — | 3 | — | 3 |
| Stearic acid | 2.0 | 2.0 | 2.0 | 2.0 |
| Antioxidant 6PPD*4 | 1.0 | 1.0 | 1.0 | 1.0 |
| Sulfur | 1.5 | 1.5 | 1.5 | 1.5 |
| Vulcanization accelerator BBS*5 | 1.0 | 1.0 | 1.0 | 1.0 |
| Cross-linking condition: temperature (° C.)/time (min) | 160/20 | 160/20 | 160/20 | 160/20 |
| Treatment conditions |  |  |  |  |
| Treatment by fluid | None | None | Yes | Yes |
| Fluid used | — | — | $CO_2$ | $CO_2$ |
| Monomer used | — | — | MAA | MAA |
| Polymerization initiator used | — | — | DCP | DCP |
| Temperature (° C.) | — | — | 32.65 | 32.65 |
| Pressure (MPa) | — | — | 8.98 | 8.98 |
| Time (min) | — | — | 60 | 60 |
| Change in weight after treatment (wt %) | — | — | 7.3 | 9.4 |
| Heat treatment conditions: temperature (° C.)/time (min) | None | None | 160/20 | 160/20 |
| Tensile test |  |  |  |  |
| $M_{200}$ (MPa) | 1.5 | 1.7 | 3.7 | 3.5 |
| $T_B$ (MPa) | 22.1 | 20.3 | 27.0 | 23.5 |
| $E_B$ (%) | 450 | 416 | 635 | 657 |

*1Synthetic isoprene rubber (Nipol IR2200, made by Nippon Zeon)
*2Zinc oxide (AZO, made by Seido Chemical Industry)
*3Zinc oxide JIS No. 3 (made by Seido Chemical Industry)
*4N-(1,3-dimethylbutyl)-N'-phenyl-p-phenylene diamine (Antigene 6C, made by Sumitomo Chemical)
*5N-tert-butyl-2-benzothiazolyl sulfenamide (Sanceler-NS-F, made by Sanshin Chemical Industry)

Examples 6 and 7 and Comparative Examples 5 and 6

The ingredients other than the vulcanization accelerator and sulfur in each of the formulations (parts by weight) shown in Table V were mixed in a 1.5 liter internal mixer for 4 minutes and discharged to obtain a master batch. The vulcanization accelerator and sulfur shown in Table V were mixed into each batch by an open roll to obtain a rubber composition. Each composition was vulcanized in a 6-inch×6-inch×2 mm mold at 160° C. for 20 minutes to obtain a rubber sheet.

Next, the cross-linked rubber sheets of Examples 6 and 7, methacrylic acid monomer (MMA) and a polymerization initiator (organic peroxide DCP) were placed in an autoclave, then carbon dioxide was filled and the treatment was performed at a predetermined temperature and pressure for a predetermined time. After the treatment, the pressure was relieved over about 2 minutes.

TABLE V

|  | Comp. Ex. 5 Untreated cross-linked elastomer 1 | Ex. 6 Treated cross-linked elastomer 1 | Comp. Ex. 6 Untreated cross-linked elastomer 2 | Ex. 7 Treated cross-linked elastomer 2 |
|---|---|---|---|---|
| IR[*1] | 100 | 100 | 100 | 100 |
| Zinc oxide[*2] | 10 | 10 | — | — |
| Zinc oxide[*3] | — | — | 3 | 3 |
| Stearic acid | 2.0 | 2.0 | 2.0 | 2.0 |
| Antioxidant 6PPD[*4] | 1.0 | 1.0 | 1.0 | 1.0 |
| Sulfur | 1.5 | 1.5 | 1.5 | 1.5 |
| Vulcanization accelerator BBS[*5] | 1.0 | 1.0 | 1.0 | 1.0 |
| Cross-linking condition: temperature (° C.)/time (min) | 160/20 | 160/20 | 160/20 | 160/20 |
| Treatment conditions |  |  |  |  |
| Treatment by fluid | None | Yes | None | Yes |
| Fluid used | — | $CO_2$ | — | $CO_2$ |
| Monomer used | — | MAA[*6] | — | MAA[*6] |
| Polymerization initiator used | — | DCP[*7] | — | DCP[*7] |
| Temperature (° C.) | — | 32.7 | — | 32.7 |
| Pressure (MPa) | — | 9.1 | — | 9.1 |
| Time (min) | — | 60 | — | 60 |
| Change in weight after treatment (wt %) | — | 21 | — | 9.4 |
| Heat treatment conditions: temperature (° C.)/time (min) | — | 160/30 | — | 160/30 |

Table V notes
[*1]Synthetic isoprene rubber (Nipol IR2200, made by Nippon Zeon)
[*2]Active zinc oxide (AZO, made by Seido Chemical Industry)
[*3]JIS No. 3 Zinc oxide made by Seido Chemical Industry
[*4]N-(1,3-dimethylbutyl)-N'-phenyl-p-phenylene diamine (Antigene 6C, made by Sumitomo Chemical)
[*5]N-tert-butyl-2-benzothiazolyl sulfenamide (Sanceler-NS-F, made by Sanshin Chemical Industry)
[*6]Methacrylic acid (made by Kanto Chemical)
[*7]Dicumyl peroxide (made by Aldrich Chemical)

Next, rubber sheets for a measurement of bond strength were prepared from the two substances A and B (see Table VI) selected from the treated or untreated cross-linked elastomers in Table V.

The two substances A and B were placed in a mold contacting each other at their cut surfaces followed by heat treatment at 170° C. for 10 minutes. The selected two substances A and B in the each rubber sheet for the measurement is listed in Table VI with the corresponding results of the measurement.

Figure 4:
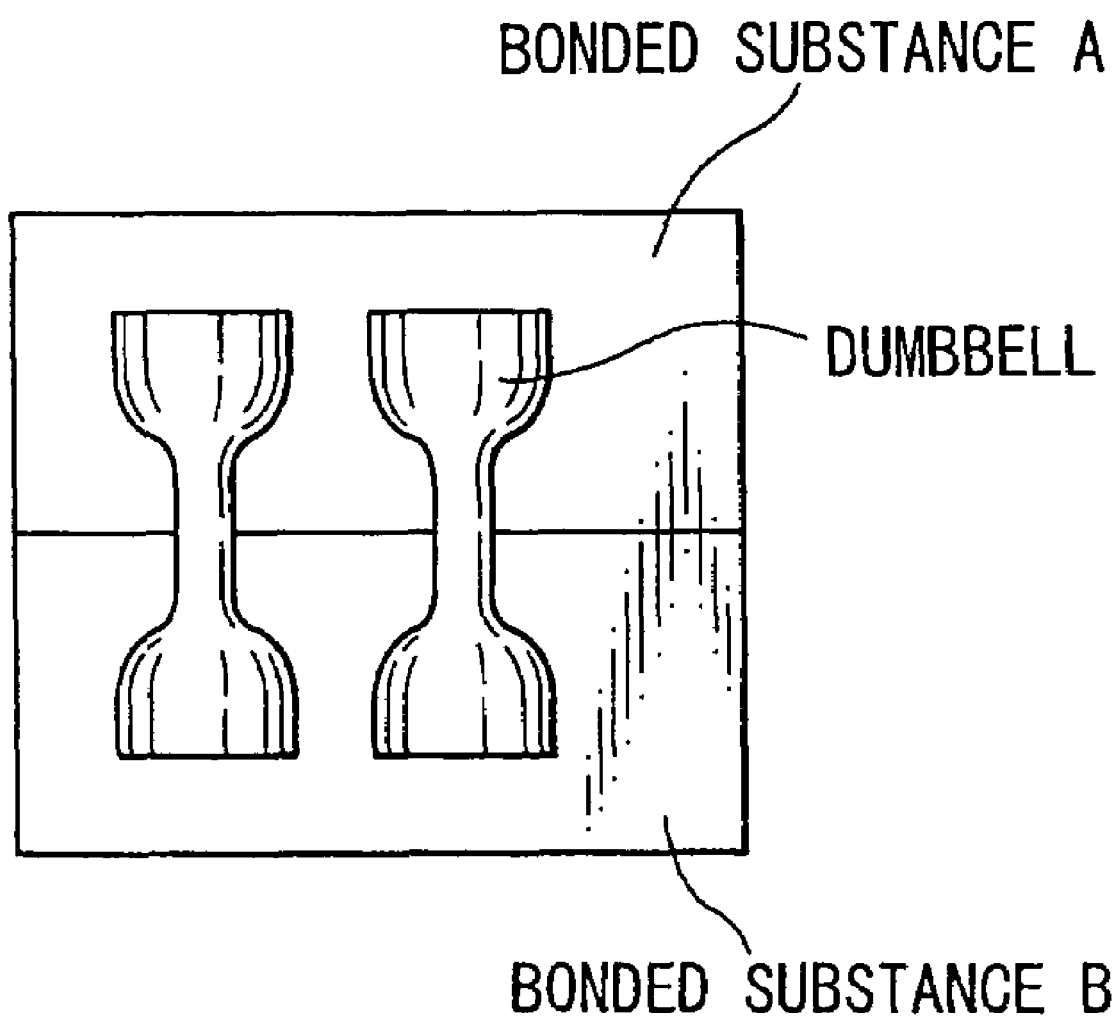
FIG. 4 shows dumbbells punched out from a sample for the measurement of bonded strength.

Measurement of bond strength: A tensile test was conducted at room temperature at a drawing speed of 500 mm/min using a JIS No. 3 dumbbell punched out, as shown in FIG. 4, so that the bonded cross-section was positioned at the sample center. The bond strength (MPa) was found from the load at the time of destruction of the bonded faces and the area of the bonded faces.

TABLE VI

| Ex. no. | Bonded substance A | Bonded substance B | Bond strength[*1] |
|---|---|---|---|
| Comp. Ex. 7 | Untreated cross-linked elastomer 1 | Untreated cross-linked elastomer 1 | Not bonded |
| Ex. 8 | Untreated cross-linked elastomer 1 | Treated cross-linked elastomer 1 | 1.4 MPa |
| Comp. Ex. 8 | Untreated cross-linked elastomer 1 | Untreated cross-linked elastomer 2 | Not bonded |
| Ex. 9 | Untreated cross-linked elastomer 1 | Treated cross-linked elastomer 2 | 1.3 MPa |
| Ex. 10 | Treated cross-linked elastomer 1 | Treated cross-linked elastomer 2 | 3.1 MPa |
| Ex. 11 | Treated cross-linked elastomer 1 | Untreated cross-linked elastomer 2 | 1.4 MPa |
| Ex. 12 | Treated cross-linked elastomer 1 | Treated cross-linked elastomer 2 | 1.6 MPa |
| Comp. Ex. 9 | Untreated cross-linked elastomer 2 | Untreated cross-linked elastomer 2 | Not bonded |
| Ex. 13 | Untreated cross-linked elastomer 2 | Untreated cross-linked elastomer 2 | 1.2 MPa |
| Ex. 14 | Treated cross-linked elastomer 2 | Treated cross-linked elastomer 1 | 2.7 MPa |

According to the present invention, an improvement in strength of the elastomer composition is achieved, and therefore, the invention can be suitably used for various types of rubber products such as tires and hoses. Further, the cross-linked elastomer composition according to the present invention can be effectively bonded with another cross-linked elastomer composition of the same type or different type, and therefore, the invention is predicted as being useful as a bonding method when laminating elastomers which had been difficult to bond in the past due to low co-crosslinkability.

The invention claimed is:

1. A method for producing an elastomer composition comprising allowing a cross-linked elastomer composition to be copresent with (A) a fluid composed of a gaseous substance at an ordinary temperature and an ordinary pressure held at a high pressure and (B) at least one component selected from the group consisting of cross-linikable or polymerizable monomers, oligomers and polymers to thereby impregnate said component (B) into the cross-linked elastomer composition, then cross-linking or polymerizing the impregnated composition, wherein said substance (A) is present in the state from the critical pressure thereof to 30 MPa and the critical temperature thereof to 200° C.

2. A method as claimed in claim 1, wherein said cross-linked elastomer composition contains a metal atom or atoms capable of reacting with a carboxyl group or groups and said cross-likable or polymerizable monomer contains a carboxyl group or groups.

3. A method as claimed in claim 1, wherein the gaseous substance (A) at an ordinary temperature and an ordinary pressure is carbon dioxide.

4. A method as claimed in claim 1, wherein the amount of the copresent component (B) is 1 to 1000 parts by weight, based upon 100 parts by weight of polymer component in the elastomer composition.

5. A method for bonding a cross-linked elastomer composition comprising allowing the cross-linked elastomer composition to be copresent with (A) a fluid composed of a gaseous substance at an ordinary temperature and an ordinary pressure held at a high pressure, (B') a cross-linikable or polymerizable monomer and (C) a polymerization initiator to thereby impregnate the ingredients (B') and (C) into the elastomer composition, then heat treating that impregnated elastomer composition while in contact with the same or another impregnated or non-impregnated elastomer composition, wherein said substance (A) is present in the state from the critical pressure thereof to 30 MPa and the critical temperature thereof to 200° C.

6. A method as claimed in claim 5, wherein the gaseous substance (A) at an ordinary temperature and an ordinary pressure is carbon dioxide.

* * * * *